United States Patent [19]

Rowe et al.

[11] 3,826,404
[45] July 30, 1974

[54] MOLDED PLASTIC PAIL
[75] Inventors: Edgar R. Rowe, Cleveland; William R. Fox, Brecksville, both of Ohio
[73] Assignee: Van Dorn Company, Cleveland, Ohio
[22] Filed: Mar. 1, 1972
[21] Appl. No.: 231,012

Related U.S. Application Data
[63] Continuation of Ser. No. 27,462, April 10, 1972, abandoned.

[52] U.S. Cl............................ 220/70, 220/74, 220/59
[51] Int. Cl............................................... B65d 7/42
[58] Field of Search............ 220/70, 74, 59; 215/31

[56] References Cited
UNITED STATES PATENTS
2,191,705  2/1940  Chamberlain..................... 220/59 X
3,516,571  6/1970  Roper et al...................... 220/74 X Primary Examiner—William I. Price
Assistant Examiner—Steven M. Pollard
Attorney, Agent, or Firm—Meyer, Tilberry & Body

[57] ABSTRACT

A molded plastic pail for storing liquids or the like having an open top end, a closed bottom wall and a side wall which extends upwardly therefrom, the pail including a bead integrally formed at the outer circumference on the open end to act as a retainer for maintaining a lid in sealing relationship with the pail wherein the bead has a downwardly extending tapered lip. The pail further contains two integrally molded bale receivers to maintain a bale in position to provide carrying means, the receivers including side portions extending longitudinally along the side wall for use in combination with a nesting ring for determining a nested position of one pail inside another. The bottom wall is recessed within the side wall and contains an integrally molded downwardly extending abutment element to control the flexing of the bottom when a filled pail is subjected to a sudden jarring or the like.

4 Claims, 8 Drawing Figures

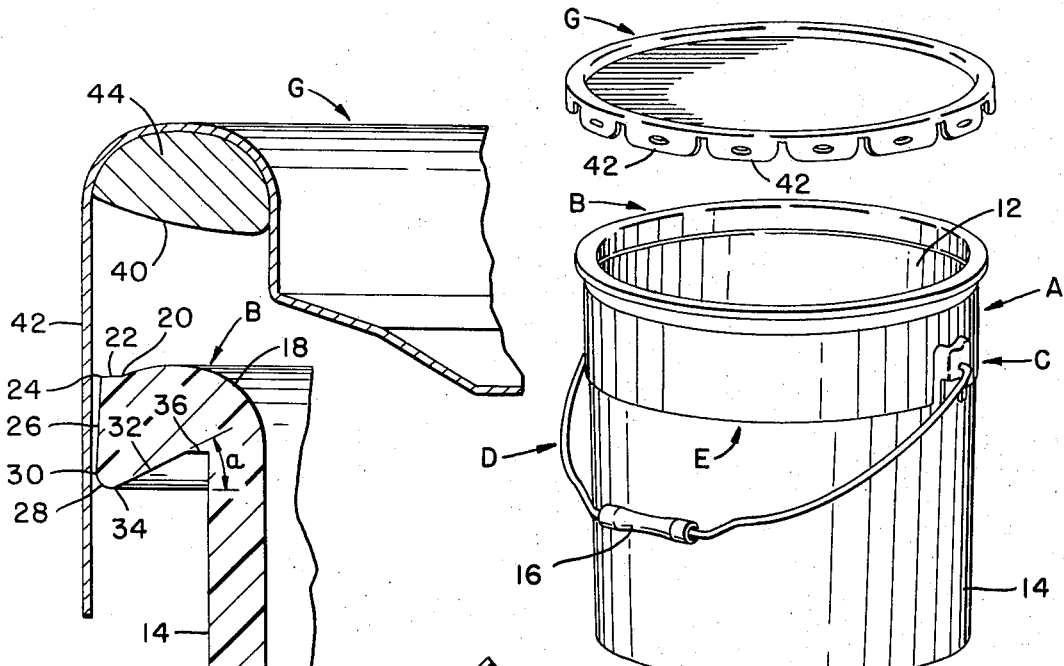
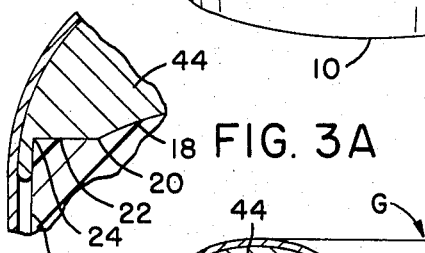
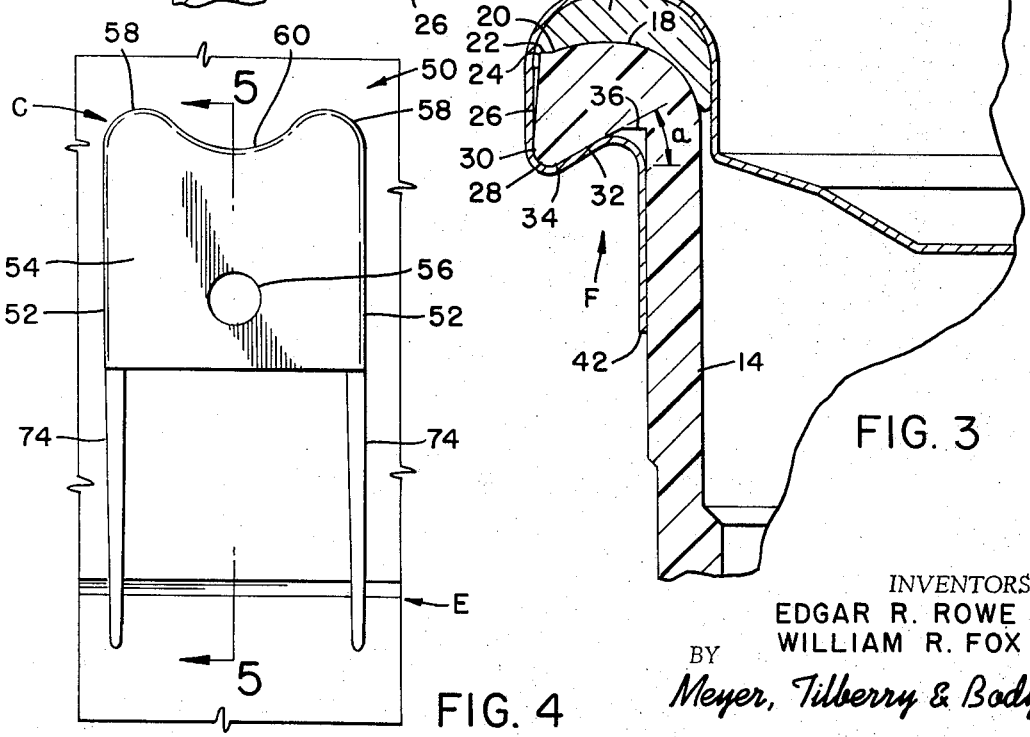

PATENTED JUL 30 1974    3,826,404

INVENTORS.
EDGAR R. ROWE
WILLIAM R. FOX
BY Meyer, Tilberry & Body
ATTORNEYS

MOLDED PLASTIC PAIL

This is a continuation of application Ser. No. 27,462 filed Apr. 10, 1970, now abandoned.

This invention pertains to the art of containers and more particularly, to a plastic pail type of containers for liquids or the like.

The invention is particularly applicable to plastic pail type of containers in which a liquid tight seal is required between a pail and lid which fits thereon, and the invention will be described with particular reference thereto; however, it is appreciated that the invention is capable of broader applications which will be apparent to those skilled in the art.

Heretofore, pail type containers were primarily constructed from metal. These metal containers were often permanently deformed when subjected to even slight external forces such as those received when a pail is dropped or bumped. Also, these metal pails were quite expensive. Metal containers further had the disadvantage of being cylindrically shaped such that it was difficult to separate them after they were nested one inside of another for storage purposes. With the advent of plastic as a material for use in making containers, efforts have been devoted to the production of large plastic containers, such as a 5 gallon pail. Such containers were generally not accepted because there was not successful upper bead design to hold the lid in place. Especially when the pail was dropped. The upper bead would be deformed and the lid would come dislodged. It was felt that this problem was due to the fact that the bead was flexible. Consequently, other arrangements were used to make the bead rigid. It was suggested to mold a metal ring within the head. This was unsuccessful because the coefficient of thermal expansion of the metal ring was different than this coefficient for plastic. Also, it was difficult to locate the ring during molding. Thus, it was suggested to use a metal collar to reinforce the bead. This again presented difficulties.

In the past, integrally molding heads (without metal inserts) consisted of a generally rounded lip portion extending circumferentially around the open end of the pail. This type of design, however, had the disadvantage that lids could not be maintained in a liquid tight sealing relationship with the pail when the pail itself was jarred or deformed in any slight manner. Variations of this type of sealing lip have so far also proved unsuccessful.

When making plastic pails, especially of the 5 gallon size, the side bale receivers were integrally molded into the side walls of the molded plastic pails. These receivers proved unsuccessful because the bales tore through the receivers when any liquid or the like was transported in the pail by using the bale means.

Because of these above discussed problems, a satisfactory molded plastic pail substitute for the long utilized metal pails has not been available.

The present invention contemplates an improved molded plastic pail which overcomes all of the above-referred disadvantages and other disadvantages associated with prior plastic pails. Additionally, the present invention provides a pail which may be reused, has a longer useful life and is less expensive.

In accordance with the present invention, there is provided a molded plastic pail having an open end, a closed bottom wall and a side wall wherein the open end has a greater area then the closed bottom wall. Extending circumferentially around the open end is an integrally molded supporting and sealing bead which cooperates in sealing engagement with a lid. This bead has a resilient, tapered lip which enhances the holding force of the bead.

In accordance with another aspect of the invention, two integrally molded bale receivers on the side wall receive a bale to provide a carrying means. The downwardly extending bale receiver, or lug, has side portions to provide convenient stopping means for one pail when it is stored inside of another by contacting the bead portion of the receiving pail.

In accordance with another aspect of the present invention, the side wall portion of the pail extends downwardly below the bottom wall to form a flange on which the pair rests. A support structure centrally located on the outside of the bottom wall and extending downwardly less than the flange portion aids in maintaining the bottom wall in a relatively flat position when the pail is filled. It also permits flexing of the bottom wall when the contents of the pail are jarred in order to prevent pail splitting.

The principal object of the invention is to provide a molded plastic pail with an integrally molded supporting and sealing bead which will remain in a sealing relationship with a lid placed thereon, even when the pail is slightly deformed or when a force is applied against the lid away from the pail.

A further object of the invention is to provide a molded plastic pail with integrally molded bale receivers to accept a bale and support the pail when it is fully loaded and carried by the bale.

A still further object of the invention is the provision of a molded plastic pail which may be conveniently nested inside other similar molded plastic pails for storage purposes and removed from the stored position when required for use.

Still another object of the invention is the provision of a molded plastic pail with a bottom wall which will flex within predetermined limits to prevent pail splitting if the contents of the pail are jarred.

These and other objects will become apparent by referring to the following description and drawings wherein:

FIG. 1 is a perspective view of a molded plastic pail containing the lid supporting and sealing bead and bale receivers;

FIG. 2 is a cross-sectional view of the integrally molded lid supporting and sealing bead;

FIG. 3 is a cross-sectional view of the integrally molded lid supporting and sealing bead in sealing engagement with a lid;

FIG. 3A is en enlarged cross-sectional view of a portion of FIG. 3 showing the sealing engagement between the bead and lid.

FIG. 4 is a front view of a bale receiver;

Figure 7:
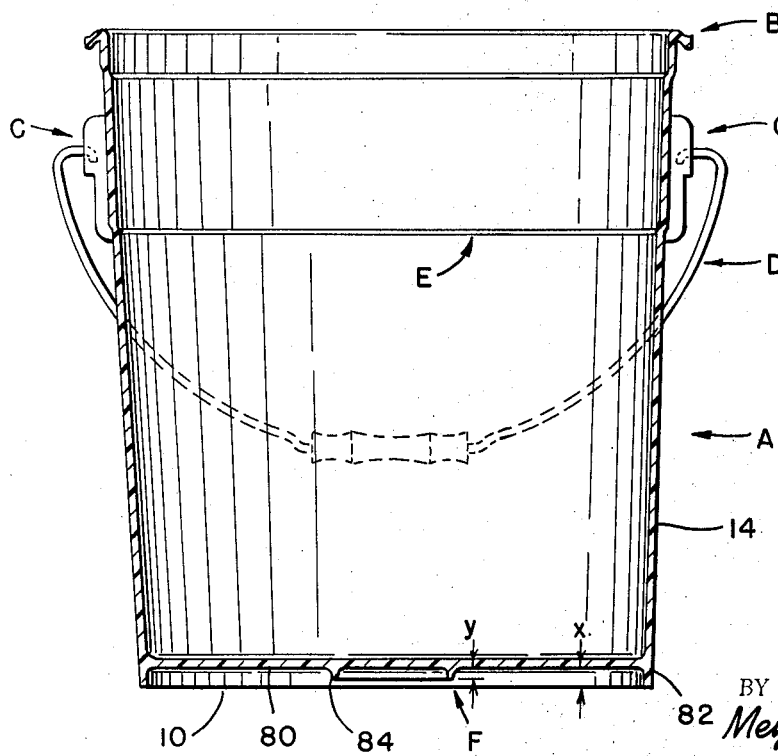

Referring now to the drawings wherein the figures are for the purpose of illustrating the preferred embodiment of the invention only, and not for purposes of limiting same, FIG. 1 shows a molded plastic pail A molded from, for example, high density polyethylene, which pail has a closed bottom end 10, best shown in FIG. 7, a larger diameter open end 12 and peripheral wall 14. An integrally molded supporting and sealing bead B extends circumferentially around open end 12. Bale receivers, or lugs, C are integrally molded into the periphery of pail A, on opposite sides of peripheral wall 14, generally more closely spaced to open end 12. A bale D is received in bale receivers C and contains hand grip 16 for purposes of carrying pail A. Peripheral wall 14 contains an abrupt diameter change or nesting ring E which effects an inwardly extending ridge circumferentially around pail A in close spaced relationship to bale receivers C towards bottom end 10. An abuttment element F, integrally molded with pail A on the outside of closed bottom end 10 (FIG. 7), provides support for the pail when filled.

The sealing bead B, best shown in FIGS. 1, 2 and 3, is integrally molded around the circumference of pail A at open end 12. Bead B begins at the inside uppermost end of peripheral wall 14 and comprises upper curvilinear surface 18 extending from pail periphery 14 outwardly to intersection area 20, generally spaced from and above upper end 12. At area 20, bead B extends further outwardly in a generally flat portion 22. Portion 22 is generally parallel with the plane of open end 12. Area 24 is the intersection of flat portion 22 and outwardly facing surface 26. Surface 26 extends circumferentially around pail A generally transverse to the plane of open end 12 from area 24, above the plane of open end 12, to a position below the plane of open upper end 12 where it joins a lower curvilinear surface 28 at an outer edge 30. Surface 28 is of a radius substantially less than that of curvilinear surface 18 and intersects a generally flat upwardly tapering, downwardly extending lip 32 at an inner edge 34. Lip 32 extends upwardly to a flat underside surface 36 which intersects peripheral wall 14. Lip 32 forms an angle $a$ in the preferred embodiment of generally between 30° to 60° with a plane extending parallel to open top end 12 through the lower extremity of curvilinear surface 28. This angle is designated $a$ in FIGS. 2 and 3. By providing a tapered plastic lip, upward force exerted by a lid flexes the lip outwardly to expand the outer diameter to enhance the holding force between the lip and the lid.

Flat portion 22, intersection area 24 and angle $a$ are of primary importance in the formation of an effective sealing relationship between pail A and a lid G as shown in FIGS. 3 and 3A. Lid G is of sufficient diameter such that it fits over and covers open end 12 and contains a circumferentially extending female recess portion 40 which is sufficiently large to receive lip B. Such a lid is the type manufactured by Rieke Corporation. When lid G is in position, flange members 42 extend coextensive with outwardly facing surface 26, and when locked in sealing relationship (FIG. 3), flanges 42 are permanently deformed around lower curvilinear surface 28 and generally coextensive with lip 32, flat underside surface 36 and pail periphery 14. Located in recess portion 40 and extending coextensive therewith, is sealing gasket 44. The actual sealing relationship between sealing bead B and lid G is primarily between the surface of bead B and gasket 44.

Prior attempts in molded plastic pails to accommodate this type of lid construction have proved unsuccessful, since the sealing beads in those embodiments corresponding to bead B of the subject invention were generally of circular cross-section. As any force was applied to the lids, the lid flanges slid around the beads to eliminate an effective sealing relationship. Further, with prior circular beads, it was extremely difficult to obtain any reliable liquid sealing relationship even under the most protected conditions.

In the subject invention, if a force F (FIG. 3) is applied indirectly to sealing bead B, the bead itself is subject to movement. Lower curvilinear surface 28, in particular, is directed in an outwardly and upwardly arcuate direction to thereby increase the effective diameter of sealing bead B.

The interaction between flat portion 22, outwardly facing surface 26 and intersection area 24 with gasket member 44 is important in that when lid G is in position with respect to open end 12, these surfaces are directed into gasket member 44 to insure a liquid tight sealing arrangement. FIG. 2 shows gasket 44 in its undeformed position and FIG. 3 shows the gasket as it is deformed in contact with the sealing bead. This deformation is such that gasket material 44 flows between surface 26 and recess 40 in the area immediately adjacent intersection area 24 as best shown in the enlarged view, FIG. 3A. If a force F is indirectly applied to sealing bead B, such that the bead is directed arcuately outward and upward, surfaces 22, 26 and point 24 are still further embedded into gasket member 44 to increase the seal between the lid and bead. The interworking between the sealing bead and lid is important, not only when a force F is directly applied to the lid and thus indirectly to the sealing bead, but also when periphery 14 of the pail itself is temporarily deformed such as, for example, by being dropped, nudged or bumped.

The above described pail and sealing bead embodiment has received vibration tests in accordance with the National Classification Board's requirements. In these tests, six of the pails were filled to a gross weight of 72 pounds with a mixture of salt and water and sealed with lids. These pails were then conditioned in 130°F. atmosphere for a period of four hours. The conditioned pails were then positioned in 3-high stacks on a Vertical Motion Vibration Tester which had been preset at a displacement of 1 inch. The tester was started and the frequency gradually advanced to a point of approximately 1G. The speed required was 270 RPM. The pails were vibrated at these conditions for one hour. Upon completion of the test, there was no evidence of leakage or deformation in any of the pails.

Figure 5:
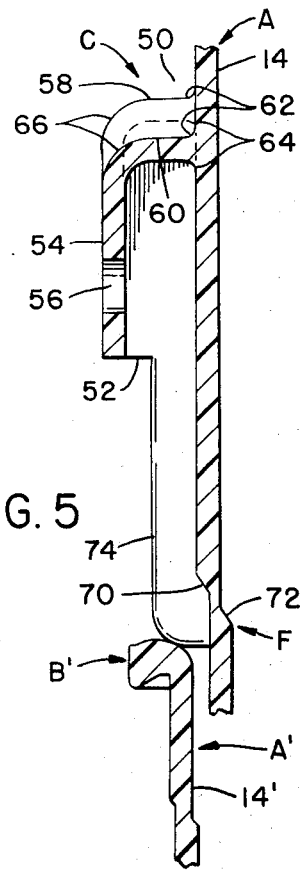
FIG. 5 is a cross-sectional view of the bale receiver of FIG. 4 taken through line 5—5 showing the nested position of two pails.

Two bale receivers C, one of which is shown in FIGS. 4 and 5, the other being identical thereto, are integrally molded with pail A. These receivers are generally hollow box-like configurations and each includes a closed end wall 50 nearest open end 12, side wall portions 52 extending outwardly from and running longitudinally along wall 14, and an outwardly facing receiver face 54 connecting walls 50, 52. Generally centrally located in each receiver face 54 is a bale receiving recess 50. Closed end walls 50 are curvilinear in nature and contain two end areas 58 which are more closely spaced towards open end 12 than a lower central area 60. Each central area 60 is generally located directly above bale receiving recess 56.

Prior attempts in the area of integrally molded plastic bale receivers have been with bale receivers having generally circular or elongated configurations. These attempts proved totally unsuccessful in that the weight of a loaded pail caused forces to be transmitted between the bale receiver and pail periphery at a single point at the uppermost portion, which, eventually led to a fault or tear between the receiver and pail periphery. The present structure, particularly curvilinear surface 50, overcomes these prior difficulties by providing two surfaces instead of one wherein forces are transmitted between bale receiver C and pail periphery 14 when a loaded pail is being carried by bale D.

Outer fillet 62 forms the intersection between the outside of closed end wall 50 and side wall portions 52 with pail periphery 14. Inner fillet 64 forms the intersection of the inside of walls 50, 52 with periphery 14. Further, receiver face 54 intersects wall 50, 52 with curvilinear surface 66. Fillets 62, 64 and surface 66 provide for easier flow of plastic during molding and prevent formation of stress areas at the respective wall intersections.

Nesting ring E, shown perspectively in FIG. 1 and in more detail in FIGS. 4 and 5, is important when consideration is directed towards nesting and storing containers which are not presently required. Ring E is comprised of an abrupt circumferential diameter change 70 on the outer portion of pail periphery 14 and corresponding change 72 on the inside of pail periphery 14. Nesting rings per se, however, are recognized as being well known in the art. Ring E may be located from bale receivers C towards bottom end 10 by, for example, a distance of 1-½ inches. Nesting stops 74 extend downwardly towards bottom wall 10 from bale receivers C and are, in effect, coextensive continuations of side wall portions 52. It is necessary that nesting stops 74 extend a distance at least sufficient to traverse nesting ring E. As most adequately shown in FIG. 5, the combination of nesting stops 74 and nesting ring E provide easy and convenient storage means for pail A inside a second pail A'. In the nested position, nesting ring E prevents binding peripheral wall contact between the inner surface of peripheral wall 14' of receiving pail A' and the outer surface of peripheral wall 14 of nested pail A. Nesting stops 74 provide means whereby nested pail A is prevented from entering receiving pail A' beyond the point where ends 76 of stops 74 contact bead B' of pail A'. This type of nesting arrangement makes is possible to store a quantity of these pails inside one another, such that the addition of each new pail increases the height of the previously nested and stacked pails a distance equal to the distance from ends 76 to curvilinear surface 18, approximately four to five inches. This distance, of course, depends upon the relative relationships of bale receivers C, nesting ring E and ends 74.

Figure 6:
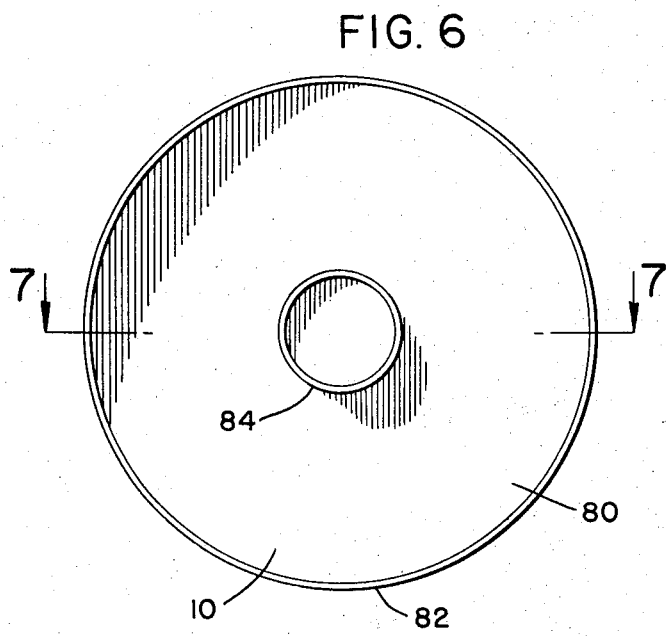
FIG. 6 is a bottom view of the pail showing the support structure and abuttment element; and, FIG. 7 is a cross-sectional view of the pail shown in FIG. 1.

Closed bottom end 10 of pail A is best shown in FIGS. 6 and 7. Bottom wall 80 is recessed upwardly towards open end 12 in pail periphery 14 to form flange 82 extending downwardly a distance $x$. This recessed bottom allows a flexing action of wall 80 when the contents of pail A are jarred in any significant manner. For example, if pail A, filled with a liquid, is dropped a distance of five feet or so, bottom 80 is free to flex or vibrate to prevent undesired splitting in the pail. To control this flexing action and prevent it from splitting and destroying the pail itself, there is integrally molded on wall 80 a centrally located wall abuttment 84 extending downwardly a distance $y$. In the preferred embodiment, abuttment 84 is cylindrical and of a substantially smaller diameter than wall 80. To allow flexing, it is necessary that distance $x$ be greater than distance $y$. It has been found that a dimentional differential of approximately 1/32 of an inch between $x$ and $y$ is most desirable.

Although the invention has been described with reference to specific embodiments, variations within the scope of the claims will be apparent to those skilled in the art.

Having thus described our invention we claim:

1. In a plastic pail having an open end, a closed bottom wall, a side wall extending upwardly therefrom, said wall including inner and outer peripheral surfaces, and a lid supporting and sealing, outwardly protruding integral bead extending around said open end, the improvement comprising:

said bead having a top portion, an outwardly facing surface and a downwardly extending generally resilient lip;

said top portion including an inner curvilinear portion and an outer generally flat portion;

said generally resilient lip portion including an outer edge, an inner edge and an upwardly tapering surface extending towards said peripheral surface at an angle of between 30° and 60° from a plane parallel to said open end, said tapered surface thereby forming a recess between said lip and said outer peripheral surface;

said curvilinear portion being integral with said open end and extending outwardly from said inner peripheral surface and wherein said flat portion extends outwardly from the outer extremity of said curvilinear surface, said curvilinear portion being convex to said open end and said flat portion being parallel with said open end.

2. In a plastic pail having an open end, a closed bottom wall, a side wall including inner and outer peripheral surfaces extending upwardly from said bottom wall, and a lid supporting and sealing, outwardly protruding integral bead extending around said open end and adapted to be received in a sealing association with a pail sealing lid, the improvement comprising:

said bead having a top portion and an outwardly facing surface, said top portion including a curvilinear portion extending outwardly from said side wall and a generally flat surface, said flat surface extending between the outer extremity of said curvilinear surface and said outwardly facing surface whereby said flat surface and said outwardly facing surface form a lid sealing protrusion; and, means for engaging said pail sealing lid adjacent the outer peripheral edge thereof, said engaging means comprising a portion of said bead and being spaced downwardly thereon from said curvilinear surface;

said curvilinear surface being raised with respect to said open end and said flat surface being generally parallel to said open end.

3. In a plastic pail having an open end, a closed bottom wall, a side wall including inner and outer peripheral surfaces extending upwardly from said bottom wall, and a lid supporting and sealing, outwardly protruding integral bead extending around said open end and adapted to be received in a sealing association with a pail sealing lid, the improvement comprising: said integral sealing bead having a top sealing portion and an outwardly facing surface with said top sealing portion including a curvilinear portion extending from a position adjacent said inner peripheral surface of said pail to a position adjacent said outwardly facing surface of said integral bead; said integral bead being undercut between said outwardly facing surface and said outer peripheral surface of said pail to define with said outwardly facing surface a lip for engaging and holding a lid onto said pail, said lip having a downwardly facing generally conical surface extending between a first position adjacent said outwardly facing surface and a second position adjacent said outer peripheral surface and an angle of generally between 30° and 60° with said outer peripheral surface, said downwardly facing surface defining an area of reduced wall thickness for said integral bead adjacent said second position, whereby upward forces on said lip causes said lip to move outwardly from said outer peripheral surface to increase the holding force against a lid secured over said integral bead.

4. The improvement as defined in claim 3 wherein the top portion of said integral bead includes a generally flat upwardly facing surface extending between said outwardly facing surface and said curvilinear top sealing portion.

* * * * *